US006914905B1

(12) United States Patent
Yip et al.

(10) Patent No.: US 6,914,905 B1
(45) Date of Patent: Jul. 5, 2005

(54) METHOD AND SYSTEM FOR VLAN AGGREGATION

(75) Inventors: Michael Yip, Sunnyvale, CA (US); Shehzad T. Merchant, Mountain View, CA (US); Kenneth T. Yin, Rumson, NJ (US)

(73) Assignee: Extreme Networks, Inc., Santa Clara, CA (US)

( * ) Notice: Subject to any disclaimer, the term of this patent is extended or adjusted under 35 U.S.C. 154(b) by 936 days.

(21) Appl. No.: 09/595,608

(22) Filed: Jun. 16, 2000

(51) Int. Cl.[7] .............................................. H04L 12/56
(52) U.S. Cl. ................................................ 370/395.53
(58) Field of Search ............................... 370/389, 392, 370/395.2, 395.3, 395.31, 395.32, 395.52, 395.53, 401, 411

(56) References Cited

U.S. PATENT DOCUMENTS

| | | | |
|---|---|---|---|
| 5,732,078 A | 3/1998 | Arango | |
| 5,737,333 A | 4/1998 | Civanlar et al. | |
| 5,742,604 A | 4/1998 | Edsall et al. | |
| 5,793,763 A | 8/1998 | Mayes et al. | |
| 5,802,106 A | 9/1998 | Packer | |
| 5,862,452 A | 1/1999 | Cudak et al. | |
| 5,909,686 A | 6/1999 | Muller et al. | |
| 5,910,955 A | 6/1999 | Nishimura et al. | |
| 5,926,463 A | 7/1999 | Ahearn et al. | |
| 5,938,736 A | 8/1999 | Muller et al. | |
| 5,946,308 A | 8/1999 | Dobbins et al. | |
| 5,949,783 A | 9/1999 | Husak et al. | |
| 5,959,989 A | * 9/1999 | Gleeson et al. | 370/390 |
| 5,968,126 A | 10/1999 | Ekstrom et al. | |
| 5,978,378 A | 11/1999 | Van Seters et al. | |
| 6,006,258 A | 12/1999 | Kalajan | |

(Continued)

OTHER PUBLICATIONS

IEEE Std 802.1Q–1998, "IEEE Standards for Local and Metropolitan Area Networks: Virtual Bridged Local Area Networks," New York, New York, 1999.
B. Kantor, "Internet Protocol Encapsulation of AX.25 Frames," Request for Comments: 1226, May 1991 ("RFC1226").
K. Egevang, "The IP Network Address Translator (NAT)," Request for Comments: 1631, May 1994, ("RFC1631").

(Continued)

*Primary Examiner*—Kwang Bin Yao
(74) *Attorney, Agent, or Firm*—Blakely Sokoloff Taylor & Zafman, LLP

(57) ABSTRACT

A method and system for an aggregated virtual local area network (VLAN) architecture in which several VLANs in a network share the same default router address and subnet mask, but remain isolated from one another's network traffic. Instead of the traditional method of assigning one subnet to a VLAN, each VLAN is assigned only a portion of a subnet's IP address space, and is further grouped into a super-VLAN uniquely associated with that subnet. Intra-VLAN traffic is forwarded only to host IP addresses assigned to that same VLAN according to a VLAN identifier carried in the data packet. Inter-VLAN traffic is processed by a virtual router interface which routes the data packet by applying the routing configuration for the subnet uniquely associated with the super-VLAN, according to a super-VLAN identifier carried in the data packet. The routing configuration used by the virtual router interface includes routing protocols, static routes, redundant router protocols and access-lists. Since each VLAN shares the same virtual router interlace, the traditional address overhead of a subnet is minimized, requiring only one default router and subnet mask, as well as only one pair of subnet broadcast addresses for all hosts on the subnet and the subnet itself. The aggregated VLAN architecture provides for the efficient use and management of a network's IP address space.

14 Claims, 3 Drawing Sheets

U.S. PATENT DOCUMENTS

| | | |
|---|---|---|
| 6,006,264 A | 12/1999 | Colby et al. |
| 6,006,272 A | 12/1999 | Aravamudan et al. |
| 6,012,090 A | 1/2000 | Chung et al. |
| 6,018,619 A | 1/2000 | Allard et al. |
| 6,023,724 A | 2/2000 | Bhatia et al. |
| 6,028,848 A | 2/2000 | Bhatia et al. |
| 6,029,203 A | 2/2000 | Bhatia et al. |
| 6,032,194 A | 2/2000 | Gai et al. |
| 6,035,105 A | 3/2000 | McCloghrie et al. |
| 6,047,325 A | 4/2000 | Jain et al. |
| 6,049,834 A | 4/2000 | Khabardar et al. |
| 6,052,803 A | 4/2000 | Bhatia et al. |
| 6,058,106 A | 5/2000 | Cudak et al. |
| 6,058,431 A | 5/2000 | Srisuresh et al. |
| 6,085,238 A | 7/2000 | Yuasa et al. |
| 6,088,356 A | 7/2000 | Hendel et al. |
| 6,094,435 A | 7/2000 | Hoffman et al. |
| 6,094,659 A | 7/2000 | Bhatia |
| 6,098,172 A | 8/2000 | Coss et al. |
| 6,104,696 A | 8/2000 | Kadambi et al. |
| 6,104,700 A | 8/2000 | Haddock et al. |
| 6,105,027 A | 8/2000 | Schneider et al. |
| 6,108,330 A | 8/2000 | Bhatia et al. |
| 6,115,278 A | 9/2000 | Deneroff et al. |
| 6,118,768 A | 9/2000 | Bhatia et al. |
| 6,118,784 A | 9/2000 | Tsuchiya et al. |
| 6,119,162 A | 9/2000 | Li et al. |
| 6,119,171 A | 9/2000 | Alkhatib |
| 6,128,657 A | 10/2000 | Okanoya et al. |
| 6,131,163 A | 10/2000 | Wiegel |
| 6,141,749 A | 10/2000 | Coss et al. |
| 6,147,995 A | 11/2000 | Dobbins et al. |
| 6,151,316 A | 11/2000 | Crayford et al. |
| 6,151,324 A | 11/2000 | Belser et al. |
| 6,154,446 A | 11/2000 | Kadambi et al. |
| 6,154,775 A | 11/2000 | Coss et al. |
| 6,154,839 A | 11/2000 | Arrow et al. |
| 6,157,647 A * | 12/2000 | Husak ..................... 370/401 |
| 6,157,955 A | 12/2000 | Narad et al. |
| 6,167,052 A * | 12/2000 | McNeill et al. ............ 370/399 |
| 6,167,445 A | 12/2000 | Gai et al. |
| 6,170,012 B1 | 1/2001 | Coss et al. |
| 6,178,455 B1 | 1/2001 | Schutte et al. |
| 6,178,505 B1 | 1/2001 | Schneider et al. |
| 6,181,681 B1 | 1/2001 | Hiscock et al. |
| 6,181,699 B1 | 1/2001 | Crinion et al. |
| 6,182,226 B1 | 1/2001 | Reid et al. |
| 6,182,228 B1 | 1/2001 | Boden et al. |
| 6,188,694 B1 | 2/2001 | Fine et al. |
| 6,195,705 B1 | 2/2001 | Leung |
| 6,202,114 B1 | 3/2001 | Dutt et al. |
| 6,208,649 B1 | 3/2001 | Kloth |
| 6,208,656 B1 | 3/2001 | Hrastar et al. |
| 6,212,558 B1 | 4/2001 | Antur et al. |
| 6,216,167 B1 | 4/2001 | Momirov |
| 6,219,706 B1 | 4/2001 | Fan et al. |
| 6,219,739 B1 | 4/2001 | Dutt et al. |
| 6,226,267 B1 | 5/2001 | Spinney et al. |
| 6,226,771 B1 | 5/2001 | Hilla et al. |
| 6,230,203 B1 | 5/2001 | Koperda et al. |
| 6,243,749 B1 | 6/2001 | Sitaraman et al. |
| 6,243,754 B1 | 6/2001 | Guerin et al. |
| 6,243,815 B1 | 6/2001 | Antur et al. |
| 6,246,669 B1 | 6/2001 | Chevalier et al. |
| 6,249,523 B1 | 6/2001 | Hrastar et al. |
| 6,252,888 B1 | 6/2001 | Fite, Jr. et al. |
| 6,253,122 B1 | 6/2001 | Razavi et al. |
| 6,256,314 B1 * | 7/2001 | Rodrig et al. ............... 370/401 |
| 6,262,976 B1 | 7/2001 | McNamara |
| 6,266,707 B1 | 7/2001 | Boden et al. |
| 6,269,099 B1 | 7/2001 | Borella et al. |
| 6,430,621 B1 | 8/2002 | Srikanth et al. |
| 6,526,052 B1 | 2/2003 | Rijhsinghani et al. |
| 6,553,028 B1 * | 4/2003 | Tang et al. ................. 370/389 |
| 6,614,787 B1 * | 9/2003 | Jain et al. ................... 370/390 |
| 6,614,792 B1 * | 9/2003 | Pazy et al. ............. 370/395.53 |
| 6,674,760 B1 * | 1/2004 | Walrand et al. ............. 370/411 |

OTHER PUBLICATIONS

W. Simpson, "IP in IP Tunneling," Request for Comments 1853, Oct. 1995, ("RFC1853").

C. Perkins, "IP Encapsulation within IP," Request for Comments 2003, Oct. 1996, ("RFC2003").

K. Hamzeh, et al., "Point–to–Point Tunneling Protocol (PPTP)," Request for Comments 2637, Jul. 1999, ("RFC2637").

D. Farinacci, et al., "Generic Routing Encapsulation (GRE)," Request for Comments 2784, Mar. 2000, ("RFC2784").

* cited by examiner

METHOD AND SYSTEM FOR VLAN AGGREGATION

BACKGROUND OF THE INVENTION

1. Field of the Invention

The present invention relates to the field of virtual local area network (VLAN) topologies and internetwork communications technologies. In particular, the present invention relates to an aggregated VLAN network architecture used in forwarding data packets by a LAN switch connecting multiple VLANs.

2. Background Information and Description of Related Art

A VLAN is a logical grouping of networked host computers on some other basis than the physical network location (e.g. department, primary application). VLANs allow network managers to more easily manage dynamic networks where the identity and location of the network's users are constantly changing.

VLANs can be implemented in a number of different ways, depending on the network strategy. A prior art traditional layer-2 VLAN is based on a logical grouping of the layer-2 switch ports to which the hosts connect. Alternative prior art layer-2 VLANs define VLAN membership by the host's Media Access Control (MAC) layer address. An example of a port-based prior art VLAN is shown in FIG. 1. As illustrated, VLAN A 110 is defined as the set of hosts H1 111, H2 112, and H3 113 that respectively connect to layer-2 switch S1 140 ports P1 141, P2 142, and P3 143. VLAN B 120 is defined as the set of hosts H4 121 and H5 122 that respectively connect to layer-2 switch S1 140 ports P4 144 and P5 145. Prior art second-generation VLANs can also span multiple switches connected by backbone 100. For example, as illustrated, VLAN C 130 is defined as the set of hosts H6 131, H7 132, and H8 133 that respectively connect to layer-2 switch S1 140 ports P6 146 and layer-2 switch S2 150 ports P1 151 and P2 152.

Subsequent generations of prior art VLANs are embodied in layer-3 switches. Prior art layer-3 VLANs include VLANs based on the protocol type in a multi-protocol environment, or on a network-layer address such as an Internet Protocol (IP) multicast group, or a subnet address in a Transmission Control Protocol (TCP)/IP network environment. An example of a prior art layer-3 VLAN based on subnet address is shown in FIG. 2. As illustrated, VLAN D 210 is defined as the set of hosts H1 211, H2 212 and H3 213 on subnet SN1 220 that connects to layer-3 switch S3 230, which in turn connects to gateway 200. VLAN E 240 is defined as the set of hosts H4 241, H5 242 and H6 243 on subnet SN2 250 that connects to layer-3 switch S3 230, and so forth.

An advantage of prior art VLANs based on layer-3 information such as the subnet address, is that it allows hosts to move to a different physical port on the switch in the same VLAN without having to reconfigure the host IP addresses. In an Internet Service Provider (ISP) environment, VLAN membership is often based on the subnet address for this reason, among others.

An advantage of all prior art VLANs is that the layer-2 or layer-3 switch is able to use VLAN membership to contain network traffic. For example, traffic originating on one port is only switched to other ports belonging to the same VLAN, or traffic originating on one subnet is only switched to other hosts belonging to the same subnet. For this reason, VLANs are often referred to as broadcast domains. VLANs avoid wasting bandwidth caused by unnecessarily forwarding traffic to switches for which there are no potential recipients (i.e. switches that do not have ports belonging to that particular VLAN, or that do not connect to hosts belonging to the same subnet). For example, with reference to FIG. 1, layer-2 switch S2 150 does not have any ports belonging to VLAN A 110 or VLAN B 120, but does have ports belonging to VLAN C 130. Thus, traffic originating from ports belonging to VLAN A 110 or VLAN B 120 is not forwarded to layer-2 switch S2 150, but traffic originating from port P6 140 VLAN C 130 is forwarded to layer-2 switch S2 150 ports P1 151 and P2 152.

The subnet address that is commonly used as the basis for defining the layer-3 VLANs is a type of Internet Protocol address (IP address) used to route data packets across heterogeneous networks. IP addresses are 32-bit numbers that have a two-level structure: a network number and a host number. The network number uniquely identifies the network through which the host connects to the Internet, and the host number uniquely identifies the address, or location, of the host on that uniquely identified network. As the number of networks requiring access to the Internet has grown, a third level was introduced into Internet routing protocols to augment the original two-level addressing structure. This third level defines a sub-network, or "subnet."

A subnet address may represent all the hosts at one geographic location, in one building, or on the same LAN or VLAN. An advantage to dividing a network into subnets is that it allows an organization (such as an ISP) to be connected to the Internet with a single shared network address. As a consequence, only one IP network address need be exported by routing protocols for all subnets belonging to a particular network, thereby reducing the routing overhead of the Internet. Without subnets, an ISP could get multiple connections to the Internet, one for each of its logically separate networks, but this would result in an inefficient and unnecessary use of the limited number of unique network numbers, as well as an unnecessary increase in the size of the global routing tables needed to properly route data packets from one network to another. The standard procedure for creating and identifying subnets is provided in Internet Request For Comments (RFC) 950.

Like VLANs, subnets can be used to contain network broadcast traffic, i.e. data packets from one subnet can be broadcast only to other hosts in the same subnet by using the appropriate broadcast IP addresses and routing protocols. In addition, a data packet can be broadcast to a specific subnet. In this way, a subnet is also considered a broadcast domain.

A typical use of the prior art layer-3 VLAN switches is in an ISP environment, where VLAN membership may be based on network layer information such as the layer-3 protocol type or layer-3 subnet address as previously described. Traditionally, the ISP assigns each of their subscribers to a separate VLAN based on a unique subnet address within the ISP's own IP address network space. However, there are a number of drawbacks to assigning each subscriber their own VLAN based on a unique subnet address.

One drawback is that implementations of a subnet addressing scheme must set aside certain special purpose IP addresses that cannot be used for host IP addresses. The special purpose IP addresses include at least two different broadcast IP addresses, a default router address (i.e. the address of the default gateway for the subnet), and, in an ISP environment, at least one IP address for a subscriber node.

The two broadcast IP addresses that must be set aside are fixed addresses with functional significance, i.e. they are used to broadcast data packets to the subnet. One is the "all hosts" address, consisting of the network number, subnet number, and all ones in the host number field. This address has the effect of transmitting the data packet to all of the hosts affiliated with that subnet. The other is the "this network" address, consisting of the network number, subnet number, and all zeroes in the host number field. This address has the effect of transmitting the data packet to the subnet only. The broadcasting IP addresses are useful when a host needs to request information but does not know exactly where to get it, or when a host needs to announce information to all other hosts on a subnet.

As a result of having to set aside these four types of special purpose and broadcast IP addresses, the IP address space overhead of subnets can become quite large, particularly when dividing a given IP network address space up into several smaller subnets, as is often the case in an ISP environment. For example, Table 1 illustrates the addressing overhead for an ISP that allocates 8 subnets to its subscribers, with each subnet being a /27 network (where the forward-slash notation refers to the length of the combined network number/subnet number prefix of the IP address).

TABLE 1

| IP Address Prefix length | # of Individual Addresses Available | # of Special Purpose Addresses Required |
|---|---|---|
| /27 | 32 × 8 subnets = 256 | 4 × 8 subnets = 32 |

As can be seen, each /27 network is capable of supporting only 28 hosts, because 4 of the potentially available host addresses must be set aside for the broadcast addresses, default router, and subscriber node. For the 8 subnets, this results in a greater than 12.5% loss in potential address space (32/256×100=12.5%). When multiplied by hundreds and thousands of subscriber subnets, this represents a significant waste of the available IP address space.

Another drawback to assigning each subscriber their own unique subnet, is the requirement of storing another 32-bit number, called a subnet mask, to support the interpretation of the IP addresses for each different subnet. The subnet mask is a bit-mask with bits set in the positions corresponding to the IP network number, and additional bits set in the positions corresponding to the subnet number. The bit positions corresponding to the host number default to zero.

An example of a subnet address mask used to define up to eight different subnets in a /24 network address space (also referred to as a Class C network) is shown in Table 2 below.

TABLE 2

| | Dotted Decimal Notation | Binary Representation |
|---|---|---|
| IP Address | 193.1.1.0/24 | 11000001.00000001.00000001.00000000 |
| Subnet Mask | 255.255.255.224 | 11111111.11111111.11111111.11100000 |

As can be seen, the subnet mask consists of 27 set bits, followed by 5 zero bits. The first 24 bits correspond to the binary network number prefix of the IP address, and the $25^{th}$–$27^{th}$ bits correspond to the subnet number prefix of the IP address, in this case a 3-bit binary number having a decimal value from 0 through 7. Together, they are referred to as the extended network prefix. The 5 zero bits represent the bits that define the host addresses on each subnet, for a total of 32 hosts. (As noted earlier, up to 4 of those 32 host addresses cannot be assigned to a host, but rather must be set aside for broadcast or other special purposes.)

Standard subnetting protocols require that the subnet mask be stored and compared by the router interface against the data packets to determine whether they can be sent directly to the destination on the local network or if they must be sent to a gateway. Therefore, the use of subnets results in an unavoidable amount of subnet mask storage and processing overhead that must be incurred when forwarding and routing data packets.

Yet another drawback to assigning each subscriber their own individual subnet is the constraints on the number and size of subnets imposed by the subnet addressing scheme itself. Since subnets must be defined along binary boundaries that yield host address blocks in powers of two, an ISP can only define as many subnets as will accommodate the host address space needed by the largest subnet. For example, a /24 network address space (Class C network) could be subnetted into $2^3$ or 8127 subnets, each supporting $2^5$, or 32 hosts, minus at least the two broadcast addresses, for a total of 30 hosts. If the largest subnet requires 50 host addresses, then the /24 network address space (Class C network) instead can only be divided into $2^2$ or 4/26 subnets, each supporting ($2^6$-2), or 62 hosts. Even larger host address spaces, say 500–1000 hosts, would need their own /22 or /23 subnet carved out of a /16 network address space (Class B network). Since ISPs often service subscribers of varying and unpredictable size, assigning each subscriber an individual subnet can result in extremely inefficient allocation of the available host address space.

As the demand for Internet access has grown, the necessity of conserving IP address space and reducing routing overhead has become more critical. Moreover, ISPs are increasingly rolling out significantly scaled server co-location and hosting facilities for a variety of subscribers of unpredictable size, servicing smaller organizations consisting of fewer than 100 hosts, as well as larger organizations consisting of thousands of hosts each. Accordingly, a new approach for providing dynamic and efficient management of VLANs, the available IP address space, and routing protocols for network traffic is desirable.

SUMMARY

According to one aspect of the invention, a method and system is provided in which an aggregated VLAN network architecture is used in forwarding data packets by a LAN switch connecting multiple VLANs. Instead of assigning each subscriber's VLAN to one subnet, the method and system of the present invention assigns each subscriber to a "sub-VLAN" that shares a subnet with other subscribers' sub-VLANs. All of the sub-VLANs sharing the same subnet are hierarchically organized into a single "super-VLAN." The super-VLAN is uniquely associated with that same subnet, and each sub-VLAN of the super-VLAN shares in the host address space supported by that subnet. As a result, the sub-VLANs can also 1) share the same virtual router interface (i.e. the routing configuration from the super-VLAN subnet), 2) configure the same default router, and 3) share the same subnet mask. By using VLAN aggregation architecture, the switches embodied by the present invention not only enable IP address conservation and routing efficiency, but are capable of separating subnet-like traffic between individual subscribers of unpredictable size.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a VLAN aggregation method and system, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and system is implemented in a router, server or gateway, as a software routine, hardware circuit, firmware, or a combination thereof.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Overview Of VLAN Aggregation Architecture

Figure 1:
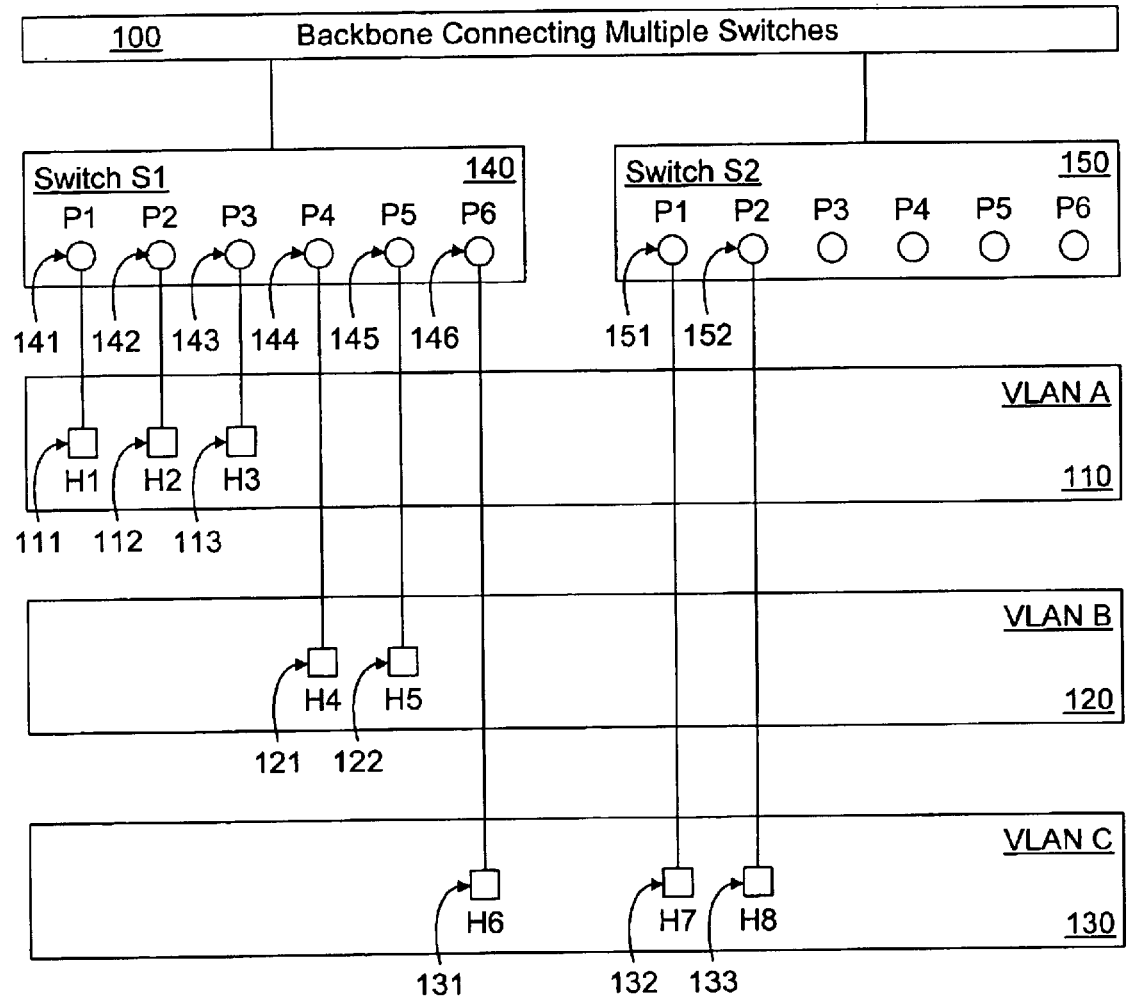
FIG. 1 illustrates a block diagram of a prior art VLAN switch configuration.
Figure 2:
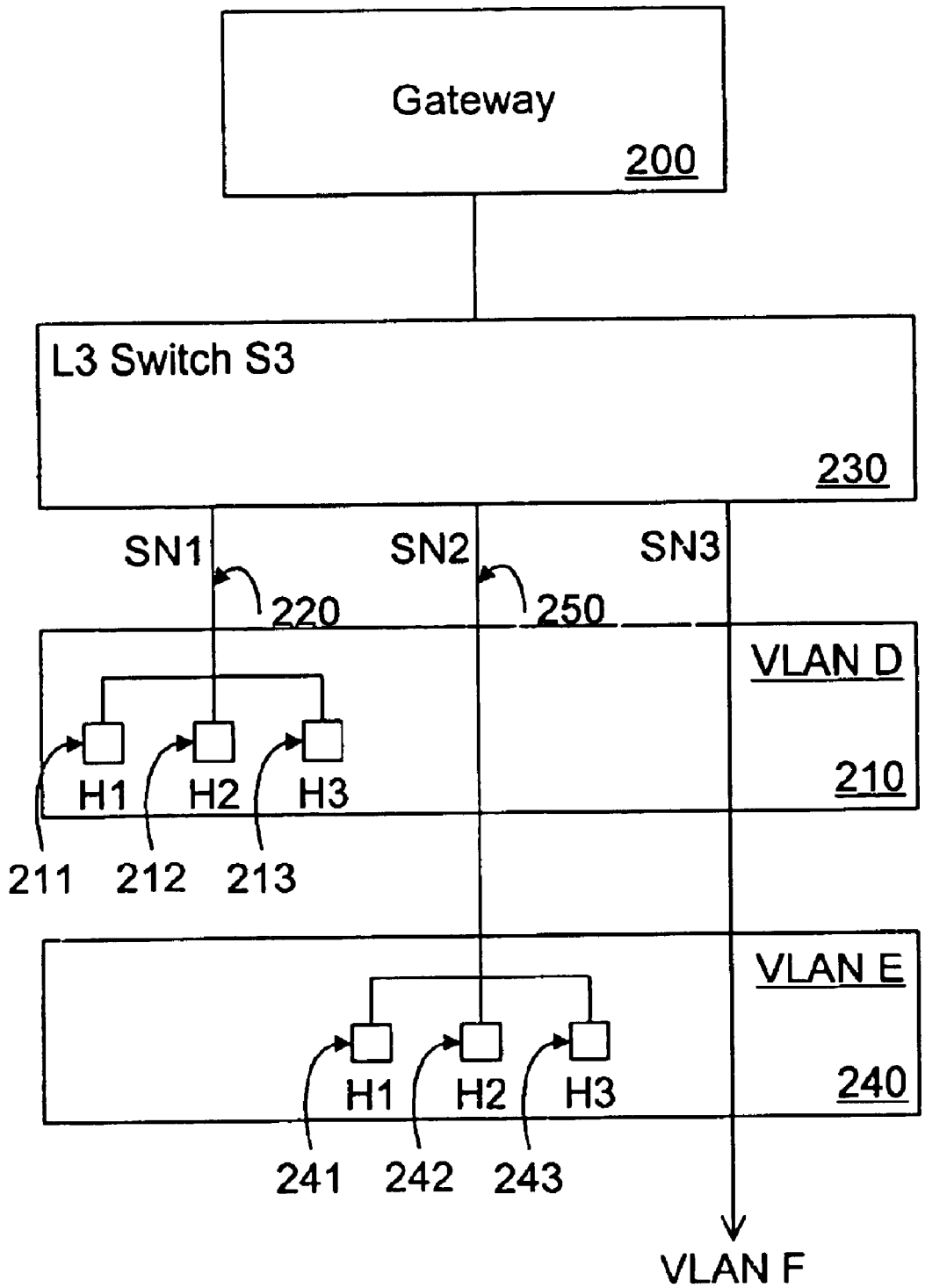
FIG. 2 illustrates a block diagram of another prior art VLAN switch configuration.
Figure 3:
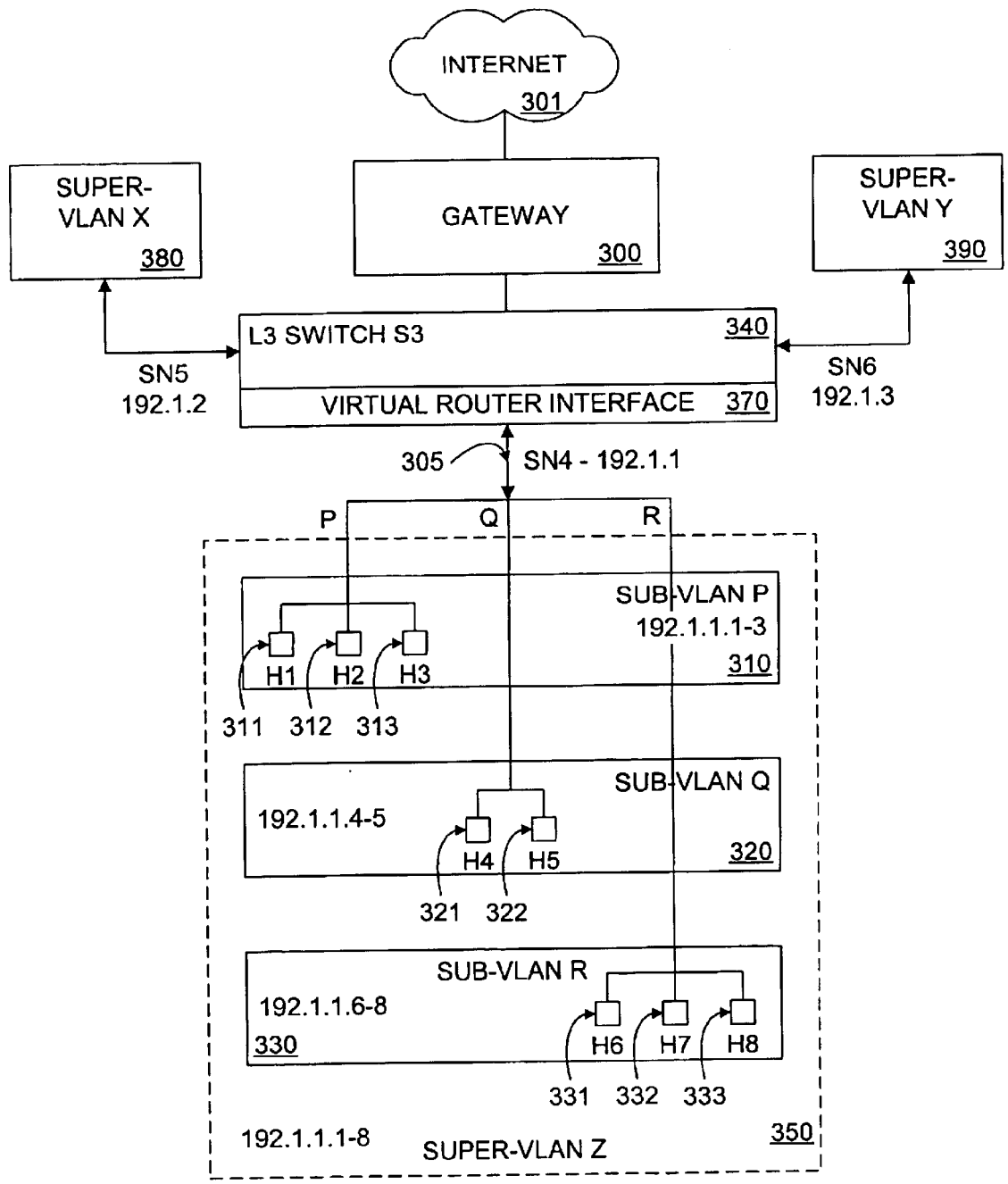
FIG. 3 illustrates a block diagram of one embodiment of an aggregated VLAN architecture configured in accordance with the present invention.

Referring now to FIG. 3, wherein a block diagram illustrating a configuration of one embodiment of an aggregated VLAN architecture in accordance with the method and system of the present invention is shown. As illustrated, sub-VLAN P 310 is defined as the set of hosts H1 311, H2 312, and H3 313 that respectively connect to layer-3 switch S4 340 using subnet SN4 305. In a similar manner, sub-VLAN Q 320 is defined as the set of hosts H4 321 and H5 322 that respectively connect to layer-3 switch S4 340, also using subnet SN4 305. As illustrated, sub-VLAN R 330 is similarly connected to switch S4 340 using subnet SN4 305. All three of the sub-VLANs P, Q, and R, 310, 320, and 330, are further hierarchically organized into super-VLAN Z 350. super-VLAN Z 350 is connected to layer-3 switch S4 340, also using subnet SN4 305, which in turn connects to gateway 300 and to the Internet 301. In the illustrated embodiment, additional super-VLANs X 380 and Y 390 may be similarly connected (detailed configuration not shown). Switch S4 340 contains a virtual router interface 370 that applies the routing configurations for super-VLAN Z 350 and each of the other super-VLANs X and Y 380 and 390 to which it is connected, including routing protocols, static routes, redundant router protocols and access-lists.

As further illustrated, super-VLAN Z 350 is associated with a /24 subnet having an IP address of 192.1.1. sub-VLAN P 310 uses host IP addresses 192.1.1.1-3, sub-VLAN Q 320 uses host IP addresses 192.1.1.4-5, and sub-VLAN R 330 uses host IP addresses 192.1.1.6-8. Of course, different allocations of the subnet address space can be made, depending on the number of hosts to be supported on the VLAN. For example, VLAN P 310 may need to support only 50 hosts, while VLAN Q 320 may need to support 1000 hosts. All of the sub-VLANs P, Q, and R, 310, 320, and 330 share a common gateway address of 192.1, and the common broadcast addresses 360 192.1.1.0 (i.e. the "all zeros" or "this network" address 361) and 192.1.1.255 (i.e. the "all ones" "all hosts" address 362). Furthermore, in an ISP environment, sub-VLANs P, Q, and R, 310, 320, and 330 can share at least one common subscriber node address (not shown).

In the illustrated embodiment, sub-VLAN P 310, sub-VLAN Q 320 and sub-VLAN R 330 are defined as sub-VLANs belonging to super-VLAN Z 350 and sharing a /24 subnet SN4 305 address space 192.1.1. However, it should be understood that other variations for determining sub-VLAN (and super-VLAN) membership using subnets may be employed without departing from the principles of or exceeding the scope of the present invention. Moreover, while the description that follows addresses the method and system as it applies to an internetwork (Internet) application, it is appreciated by those of ordinary skill in the art that method is generally applicable to any network application including, but not limited to, Local Area Networks (LANs), Metropolitan Area Networks (MANs), and Wide Area Networks (WANs).

Additionally, while an embodiment is described in the context of sharing subnet address space, it is appreciated that the invention is equally applicable in a Classless Inter-Domain Routing (CIDR) environment. CIDR is documented in RFC 1518 and RFC 1519. The primary requirement for CIDR is the use of well known routing protocols that support it, such as RIP Version 2, OSPF Version 2, and BGP Version 4. In CIDR, the subnet mask is an integral part of routing tables and protocols. Moreover, a route is not an IP address, broken down into network and host bits according to its class, rather, a route is a combination of address and mask. Thus, not only can network be divided into "subnets", but the networks can be combined into "supernets", so long as they have a common network prefix. CIDR defines address assignment and aggregation strategies designed to minimize the size of top-level Internet routing tables, just as traditional subnets do.

In operation, each sub-VLAN P, Q, and R 310, 320, and 330 in the illustrated embodiment functions as a layer-2 broadcast domain. Thus, local broadcast packets originating from subscribers in sub-VLAN P 310 are confined to destination hosts belonging to sub-VLAN P 310, local broadcast packets originating from subscribers in sub-VLAN Q 320 are confined to destination hosts belonging to sub-VLAN Q 320, and so forth. For example, a Windows 95/NT network neighborhood search will not discover other subscribers' host machines.

Intra-Sub-VLAN Communication

Data packets originating within the sub-VLANs P, Q, and R 310, 320, and 330 in the illustrated embodiment carries a VLAN identification that can be used to provide intra-sub-VLAN communication using existing layer-2 VLAN forwarding mechanisms. While no other information is needed, additional constraints and layer-2 filtering can be defined as needed to improve performance. As there is no single official standard protocol for communication of VLAN information, existing VLAN forwarding mechanisms may be employed, including proprietary VLAN communication protocols. The method commonly used is known as "frame-tagging." In frame-tagging, packets originating from a host belonging to a VLAN acquire a VLAN identifier (VLAN ID) as they are switched onto a shared backbone network. The VLAN ID is what enables the receiving switches to forward the packets intelligently by switching the packets to only those switches that are members of the same VLAN. A non-proprietary VLAN communication protocol has been incorporated into the IEEE 802.1Q standard, whereby the VLAN ID is part of the IEEE 802.1Q header inserted between the MAC header and the frame's data. In one embodiment of the present invention, the VLAN ID is modified to include the super-VLAN membership identification as well as the sub-VLAN membership, regardless of the VLAN communication protocol used to forward the VLAN packets.

Inter-Sub-VLAN Communication

Communication between the logically defined sub-VLANs P, Q, and R 310, 320, and 330 (inter-sub-VLAN communication) requires layer-3 routing. In one embodiment of the present invention, communication between the sub-VLANs P, Q, and R 310, 320, and 330 is routed through the super-VLAN Z 350, using the virtual router interface 370. As part of the VLAN ID stored in the packet, the super-VLAN membership identification provides the necessary information to the virtual router interface 370 to apply the proper routing configurations associated with the subnet to which the super-VLAN Z is assigned, in this case the /24 subnet 192.1.1. The routing configurations include routing protocols, static routes, redundant router protocols, subnet masks and access-lists. Since all sub-VLANs P, Q, and R 310, 320, and 330 share the same virtual router interface 370, each sub-VLAN P, Q, and R 310, 320, and 330 can configure the same default router (gateway) and share the same (or longer) subnet mask. As a result, the traditional address overhead of the prior art one subnet per VLAN architecture is minimized. Furthermore, IP addresses are used with maximum efficiency, making the task of managing moves, additions, and changes to the network trivial.

It should be noted that Address Resolution Protocol (ARP) proxy may be performed between hosts across different sub-VLANs. When a host transmits an ARP request for a host on another sub-VLAN, the switch generates an ARP response to the requesting host. This forces the VLAN data packets to be sent to the switch (by specifying the MAC address of the switch) so that the packets can be routed from one sub-VLAN to another.

If necessary, steps may be taken to prevent the communication between the sub-VLANs by disabling sub-VLAN proxy Address Resolution Protocol (ARP) while still allowing communication with other VLANs. The present invention also envisions a mechanism to prevent IP address theft between sub-VLANs (i.e. using the same IP address in multiple sub-VLANs that belong to same super-VLAN).

CONCLUSION

Accordingly, a novel method and system is described for an aggregated VLAN network architecture used in forwarding data packets by a LAN switch connecting multiple VLANs. From the foregoing description, those skilled in the art will recognize that many other variations of the present invention are possible. In particular, while the present invention has been described as being implemented in a network comprising one or more LAN switches, such as S4 340, a virtual router interface 370, sub-VLANs 310, 320, and 330 and super-VLAN 350, some of the logic may be distributed in other components of a network or internetwork application.

For example, embodiments of the invention may be represented as a software product stored on a machine-readable medium (also referred to as a computer-readable medium or a processor-readable medium). The machine-readable medium may be any type of magnetic, optical, or electrical storage medium including a diskette, CD-ROM, memory device (volatile or non-volatile), or similar storage mechanism. The machine-readable medium may contain various sets of instructions, code sequences, configuration information, or other data. As an example, the procedures described herein for a virtual router interface 370 can be stored on the machine-readable medium. Those of ordinary skill in the art will appreciate that other instructions and operations necessary to implement the described invention may also be stored on the machine-readable medium.

Thus, the present invention is not limited by the details described. Instead, the present invention can be practiced with modifications and alterations within the spirit and scope of the appended claims.

What is claimed is:

1. An aggregated virtual local area network (VLAN) architecture system comprising:
    a network having at least one of a plurality of subnets, each subnet having a routing configuration;
    a super-VLAN uniquely associated with a one of the plurality of subnets and the routing configuration, the super-VLAN aggregating a plurality of sub-VLANs, each sub-VLAN sharing a common virtual router interface that applies the routing configuration of the uniquely associated subnet of the super-VLAN to each sub-VLAN.

2. The aggregated VLAN architecture of claim 1 wherein a local area network (LAN) switch only forwards a data packet having a VLAN ID that matches a VLAN ID for a one of the plurality of sub-VLANs controlled by the LAN switch, and if not, routes the data packet according to a destination IP address specified in the data packet.

3. The aggregated VLAN architecture of claim 1 wherein multiple subnets of the plurality of subnets are uniquely associated with a super-VLAN, and wherein the virtual router interface routes data packets having a VLAN ID for a one of the super-VLANs controlled by a LAN switch interfacing the network in accordance with the routing configuration of the subnet uniquely associated with the super-VLAN identified in the data packet's VLAN ID.

4. The aggregated VLAN architecture of claim 1 wherein the routing configuration of the subnet uniquely associated with the super-VLAN includes a common default gateway IP address, a first broadcast IP address for all hosts on the subnet and a second broadcast IP address for the subnet only.

5. The aggregated VLAN architecture of claim 4 wherein the routing configuration further includes a subnet mask shared by each of the super-VLAN's sub-VLANs.

6. A method for an aggregated VLAN architecture comprising;
    assigning a portion of a subnet IP address space to one of a plurality of VLANs;
    grouping the plurality of VLANs assigned to portions of the same subnet IP address space into a super-VLAN uniquely associated with the same subnet IP address space;
    propagating a data packet carrying a VLAN ID that identifies the VLAN and super-VLAN with which the data packet is associated;
    forwarding an intra-VLAN data packet according to the VLAN identified in the data packet's VLAN ID; and
    routing an inter-VLAN data packet according to a destination IP address specified in the data packet.

7. The method of claim 6, wherein the VLAN ID comprises an identifier derived from at least one well known field in the data packet.

8. The method of claim 7, wherein the at least one well known field comprises a source IP address and a destination IP address, and the derived identifier is based on the subnet prefix of the source IP address and destination IP address.

9. The method of claim 6, wherein forwarding an intra-VLAN data packet includes forwarding data packets within a single switch coupled to the VLAN identified in the data packet's VLAN ID and forwarding data packets across a plurality of switches coupled to the VLAN identified in the data packet's VLAN ID.

10. The method of claim 6, wherein routing an inter-VLAN data packet is performed by a virtual router interface, the virtual router interface applying a routing configuration for the subnet uniquely associated with the super-VLAN identified in the data packet's VLAN ID.

11. The method of claim 10 wherein the routing configuration of the subnet uniquely associated with the super-VLAN includes a common default gateway IP address, a first broadcast IP address for all hosts on the subnet, and a second broadcast IP address for the subnet only.

12. The method of claim 11 wherein the routing configuration further includes a subnet mask shared by each of the VLANs in the super-VLAN identified in the data packet's VLAN ID.

13. The method of claim 10, wherein the virtual router interface resides on a LAN switch coupled to the super-VLAN identified in the data packet's VLAN ID.

14. An article of manufacture comprising a machine-readable medium having stored thereon a plurality of instructions for generating an aggregated VLAN architecture, comprising:

assigning a portion of a subnet IP address space to one of a plurality of VLANs;

grouping the plurality of VLANs assigned to portions of the same subnet IP address space into a super-VLAN uniquely associated with the same subnet IP address space;

propagating a data packet carrying a VLAN ID that identifies the VLAN and super-VLAN with which the data packet is associated;

forwarding an intra-VLAN data packet according to the VLAN identified in the data packet's VLAN ID; and routing an inter-VLAN data packet according to a the super-VLAN identified in the data packet's VLAN ID.

* * * * *